READ-ONLY MAGNETIC MEMORY

Filed July 5, 1968 2 Sheets-Sheet 1

INVENTORS.
MARVIN E. STEINER &
GEORGE J. WAAS

BY Carl V. Olson
ATTORNEY

INVENTORS
MARVIN E. STEINER &
GEORGE J. WAAS
BY Carl V. Olson
ATTORNEY

United States Patent Office 3,522,592

Patented Aug. 4, 1970

3,522,592

READ-ONLY MAGNETIC MEMORY

Marvin E. Steiner, Cinnaminson, and George J. Waas, Cherry Hill, N.J., assignors to RCA Corporation, a corporation of Delaware Filed July 5, 1968, Ser. No. 742,930

Int. Cl. G11c *5/02, 11/08, 17/00*

U.S. Cl. 340—174 5 Claims

ABSTRACT OF THE DISCLOSURE

A read-only memory construction for the storage of *m* words each having *n* bits, and including *n* magnetic cores each having a "0" aperture and a "1" aperture with a central magnetic leg therebetween. There are *m* primary windings each extending through the "0" apertures of some cores to determine the storage of "0's" therein, and extending through the "1" apertures of other cores to determine the storage of "1's" therein. A secondary output signal winding is wound around the central leg of each of the magnetic cores. The undesired magnetic and capacitive coupling between the primary windings causes imbalance in output signals induced in at least some of the secondary windings. The imbalance is corrected by the addition of a multi-turn endless compensating winding extending through the "0" apertures of magnetic cores needing reinforcement of the "1" sense signals therefrom, and extending through the "1" apertures of magnetic cores needing reinforcement of the "0" sense signals therefrom. An additional driven compensating winding may also be employed.

BACKGROUND OF THE INVENTION

There are applications in electronic data processing apparatus for both random access memories and fixed or read-only memories. A fixed or read-only memory is one wherein the storage of information is relatively fixed by the mechanical or physical construction of the memory, and wherein the stored information can be electrically or electronically read out as frequently as is desired without destroying the stored information. Punched cards are an example of a fixed or a read-only memory wherein each card is employed for the storage of one or more words. Punched cards are read one card at a time in time sequence. It is desirable to have a fixed or read-only memory capable of storing a large number of words, and having means for electronically addressing any selected one of the word locations for reading out the selected stored word.

In an exemplary read-only magnetic memory, there are provided a plurality of two-apertured magnetic cores, there being as many cores as there are information bits in each of the words to be stored in the memory. Each word location in the memory is constituted by a primary winding or word conductor which threads through one or the other of the two apertures in each of the plurality of magnetic cores. Each of the information bits of a stored word is determined by whether the primary winding or word conductor is threaded through one aperture of a core to store a "1" or is threaded through the other aperture of the core to store a "0." A multi-turn secondary winding is wound around the central magnetic leg between the two apertures of each magnetic core. A desired stored word in the memory is read out therefrom by selectively energizing the corresponding primary winding, and applying the induced signals on the secondary windings to respective sense amplifiers to provide outputs for each of the bits of the selected word. Such a memory is described in U.S. Pat. No. 3,290,664, issued on Dec. 9, 1966, to C. Y. Hsueh et al.

SUMMARY OF THE INVENTION

When such a memory is constructed using a large number, such as 1,024, of primary word windings, there is an undesired magnetic and capacitive coupling of energy between the primary word selection windings when any one is selected and energized. This coupling, which is data dependent, causes imbalance in the output sense signals induced in at least some of the secondary windings. According to the invention, the imbalance is corrected by an additional endless current path compensating winding which extends through the "0" apertures of magnetic cores needing reinforcement of the "1" sense signals therefrom, and which extends through the "1" apertures of magnetic cores needing reinforcement of the "0" sense signals therefrom.

DESCRIPTION OF THE PREFERRED EMBODIMENT

Figures 1, 2, 3:
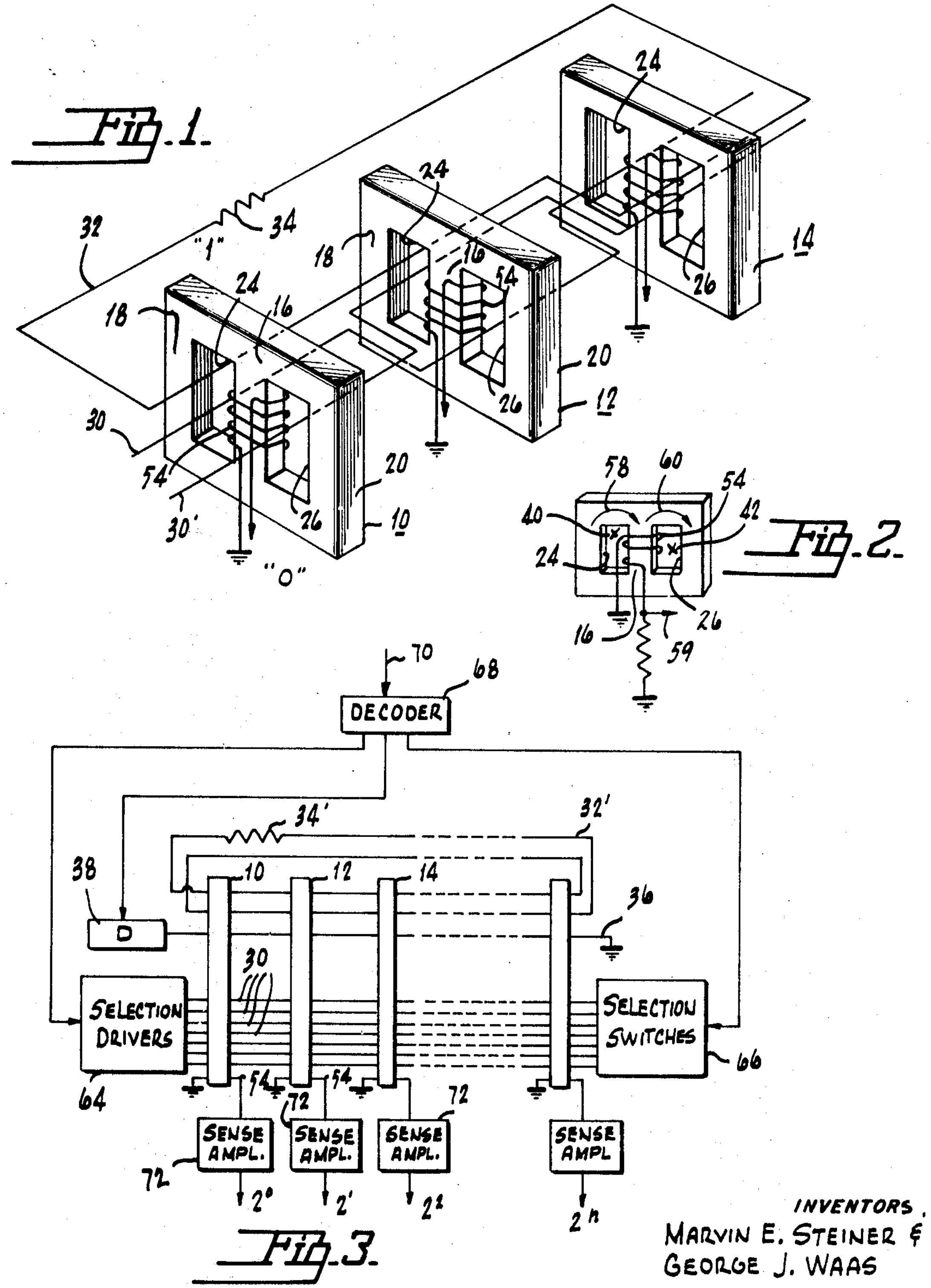
FIG. 1 is a perspective view of a fixed or read-only memory constructed according to the teachings of the invention and including two illustrative primary conductors arranged with three cores for the storage of two words each having three bits of information.
FIG. 2 is a representation of a single core which will be referred to in describing the operation of the memory of FIG. 1.
FIG. 3 is a block diagram of a fixed memory including the construction of FIG. 1 and including associated electronic circuits.

Reference will now be made in greater detail to FIG. 1 of the drawing which illustrates three, two-aperture magnetic cores 10, 12 and 14 each having a central leg 16 and two end legs 18 and 20 defining two apertures 24 and 26. The cores are preferably constructed of a ferrite magnetic material such as is commonly employed for pulse transformers. The core material is not one having a square loop hysteresis chracteristic, since the cores are used in the manner of a transformer core, rather than in the manner of a memory core having high retentivity in two magnetic states. The cores may have a linear magnetization characteristic.

One word of information stored in the memory is determined by the configuration of a primary winding conductor 30 which provides a conductive path extending through the aperture 24 of core 10 for the storage of a "1," extends through aperture 26 of core 12 for the storage of a "0," and extends through aperture 24 of core 14 for the storage of a "1." Another word of information stored in the memory is determined by the configuration of primary winding conductor 30'. Winding 30' extends in sequence through an aperture 26, an aperture 24, and an aperture 26 for storage of a word 0 1 0. Aperture 24 is herein termed the "1" aperture, and aperture 28 is termed the "0" aperture. While FIG. 1 shows only two primary winding conductors for the storage of two words each having three bits, it will be understood that a memory according to the invention will normally have a large number of primary winding conductors 20 for the purpose of storing a corresponding large number of words.

The central leg 16 of each of the cores 10, 12 and 14 has wound therearound an individual multi-turn secondary winding 54. When one word of the memory is interrogated, each secondary winding 54 provides a signal indicative of one information bit of the interrogated word.

FIG. 2 will now be referred to in describing the operation of each of the magnetic cores in the arrangement of FIG. 1. A primary winding conductor 40 carrying a current pulse going into the paper through the "1" aperture 24 causes a magnetic flux around the aperture 24 in the direction represented by the arrow 58. This, by transformer action, induces a signal in the secondary winding 54 which appears at the output terminal 59 as a signal pulse of one polarity which may represent a stored "1." An output signal of the opposite polarity representing a stored "0" is provided when the primary winding conductor 42 of another word is energized by a current pulse going into the paper through the "0" aperture 26 to produce flux in the direction represented by the arrow 60. The one of the apertures 24 and 26 through which a primary winding passes determines the direction of the flux in the central leg 16 and determines the polarity of an output signal induced on the secondary winding 54.

FIG. 1 also includes an endless current path compensating winding 32 which extends through certain "1" and "0" apertures of the cores in such a manner as to compensate for imbalance in output signals due to undesired magnetic and capacitive coupling between the many primary word wires 30, 30′, etc. The compensating winding 32 extends through the "0" apertures of cores needing reinforcement of the "1" signals therefrom, and vice versa. The endless compensating winding 32 includes a series-connected resistance 34 for limiting and wave-shaping the currents induced in the winding. A resistance value of 5,000 ohms has been successfully used. The winding 32 is endless in the sense that, together with resistance 34, it provides a closed loop path for currents induced in it. The endless compensating winding 32 may be a multi-turn winding which passes through the memory a number of times, such as six times, or two times as shown by winding 32′ in FIG. 3.

FIG. 3 illustrates a memory system including a plurality of cores including those labeled 10, 12 and 14, all the cores being linked by conductors 30 each of which defines one of a plurality of words stored in the memory. The terminals of each primary winding conductor 30 are connected to selection drivers 64 and selection switches 66, respectively. The drivers 64 and switches 66 are operated under the control of a decoder 68 in response to signals on input lead 70 which identifies the particular word desired to be read out from the read-only memory. The drivers 64, switches 66 and decoder 68 are conventional known circuits for the selection of one of a number of conductors or word lines in a memory. The secondary coil 54 wound on each of the cores is coupled to a respective sense amplifier 72. The several sense amplifiers each provide one digit of the interrogated word on the output leads labeled $2^0$, $2^1$, $2^2$ and $2^n$.

The read-only memory system shown in FIG. 3 includes an endless compensating winding 32′ which passes twice through the row of two-aperture cores. The memory system also includes a dynamic compensating winding 36 which is energized from a driver 38 every time any one of the word lines 30 is selected and energized. While the windings 30, 32′ and 36 are shown in FIG. 3 to be physically separated for clarity of illustration, the windings in practice are intimately and compactly arranged.

Figure 4:
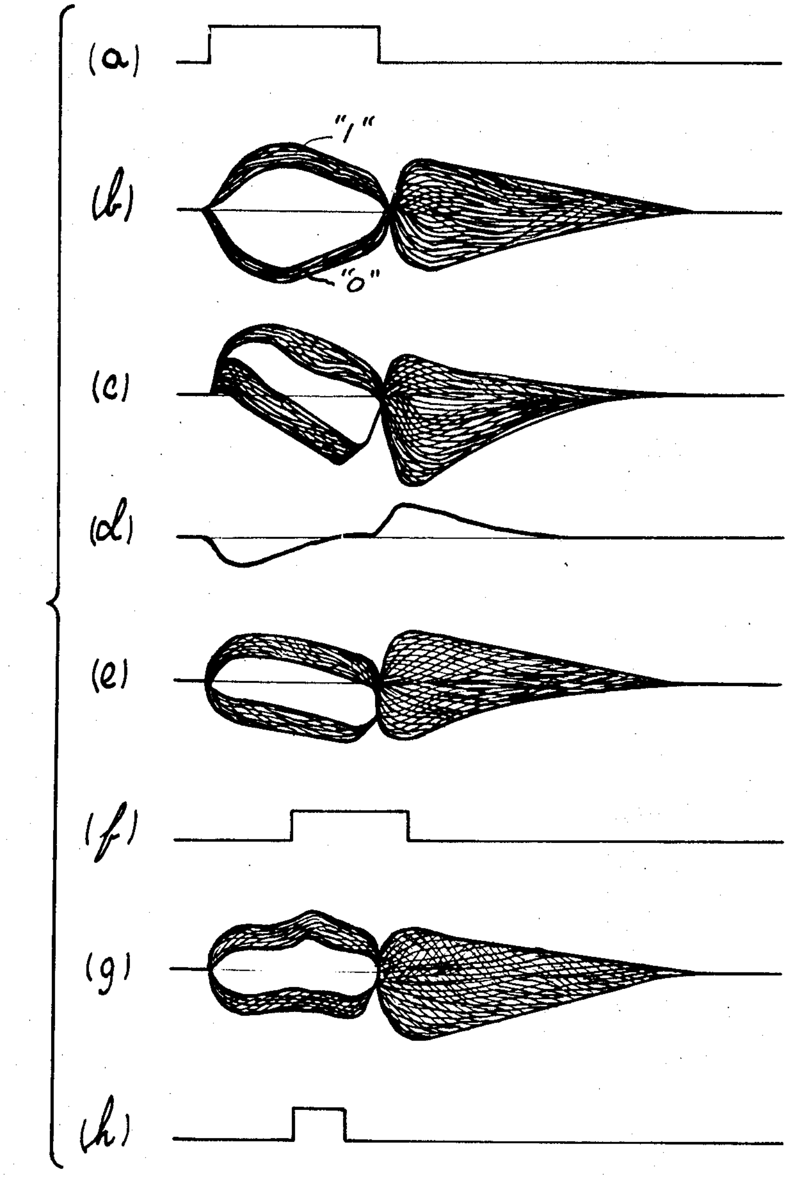
FIG. 4 is a chart of voltage waveforms that will be referred to in describing the operation of the memory of FIG. 3.

Reference is now made to FIG. 4 in connection with a description of the construction and operation of the read-only memory system including compensating windings. FIG. 4(*a*) shows the timing of a current pulse applied through any selected one of the primary word windings 30 in the system of FIG. 3 to read out the word stored along the winding. FIG. 4(*b*) shows, superimposed, all the output signals from a single two-aperture core when all of the primary word windings 30 are energized in sequence. The output signal waveforms produced by the energization of primary word windings extending through the "1" aperture of the core follow positive-going excursions labeled "1." The energization of primary word windings extending through the "0" aperture of the core produce negative-going output signal excursions labeled "0." When the output signals derived from a magnetic core are as shown in FIG. 4(*b*), all the "1" and "0" signals are easily and reliably distinguished, and no compensating means is needed to correct "1" and "0" signal imbalance.

FIG. 4(*c*) illustrates an output signal imbalance that may be encountered from any particular one of the magnetic cores in the system. In FIG. 4(*c*), the inductive coupling between any energized primary word winding and the other unenergized primary word windings causes an imbalance of the "1" and "0" output signals. FIG. 4(*d*) shows the output signal from a core due to current in the compensating winding which is needed to at least partially correct the imbalance in the output signals as represented in FIG. 4(*c*). The compensating effect illustrated in FIG. 4(*d*) is provided by an endless compensating winding 32′ threaded through the "1" aperture of a core having a characteristic as shown in FIG. 4(*c*). The effect shown in FIG. 4(*d*) when added to the characteristic shown in FIG. 4(*c*), results in a compensated characteristic as shown in FIG. 4(*e*).

The imbalance illustrated in FIG. 4(*c*) is one in which the "0" responses need reinforcement. The needed reinforcement of "0" signals is provided by extending the endless compensating winding through the "1" aperture of the core. This is so because the current induced in the endless compensating winding, when any primary winding 30 is energized, flows in the opposite direction compared with the direction of current in the energized winding.

The compensating current induced in the endless compensating winding 32′ is generated by the leading edge of the read pulse, FIG. 4(*a*), applied to a primary word winding, and is effective during approximately the first half of the read pulse. The characteristics of a given core as shown in FIG. 4(*e*) may require additional compensation during a time period corresponding with approximately the second half of the read pulse. This additional compensation is achieved by applying a current pulse of appropriate polarity from the driver 38 through the dynamic compensating winding 36 whenever any one of the primary word windings 30 is selected and energized. The timing, polarity and effect of a current pulse through the dynamic compensating winding 36 is illustrated in FIG. 4(*f*). The characteristics of FIGS. 4(*e*) and 4(*f*), when combined, result in the substantially balanced characteristic shown in FIG. 4(*g*).

The signals of FIG. 4(*g*) can be strobed at a suitable time, such as is illustrated in FIG. 4(*h*), to reliably and accurately read out the "1" or "0" output signal from the particular core when any one of the primary word windings extending through the core is energized.

In constructing a read-only memory including compensating windings, it is necessary to test the memory having the desired stored information in order to determine where to thread the compensating winding. The testing is done by sequentially energizing all of the primary word lines 30 and recording the output signal patterns from the many individual cores in superimposed relationship. The outputs from some cores may be sufficiently symmetrical, as shown in FIG. 4(*b*), in which case no compensation is needed. Other cores may have outputs as shown in FIG. 4(*c*), or may have outputs distorted in the opposite or negative direction. The degrees of imbalance in the cores may vary from slight imbalance to great imbalance, and may be in the positive direction or in the negative direction.

To most completely correct the existing imbalances, it is desirable to employ an endless compensating winding 32′ which courses several times through the row of magnetic cores. If the winding passes six times through the row of cores, the compensating winding can pass three times through the "1" aperture of a core and, in cancelling fashion, three times through the "0" aperture of the same core when it is a core which does not require any compensation. On the other hand, the endless compensating winding can pass six times through the "1" aperture of a core requiring the maximum amount of reinforcement of "0" signals, or vice versa. Cores requiring intermediate amounts of compensation may have the endless compensating winding passing a total of six times through "1" and "0" apertures with an appropriate division of the passes between the "1" and "0" apertures. The proportions of "1" and "0" passes needed through a particular core can be accurately estimated from the plotted superimposed output waveforms generated by the core. The waveshape of the current induced in the endless compensating winding 32' is determined by the series resistance 34' and the active inductance in the system.

The dynamic compensating winding 36 may also be constituted of a plurality of windings, each energized in one of the other of the two polarities and threaded through the cores to provide an appropriate needed compensating effect in each core.

By the inclusion of the endless compensating winding 32' and the dynamic compensating windings 36, reliable operation can be obtained from a read-only memory having a much larger number of word storage locations than would otherwise be possible. The addition of the compensated windings add very little to the cost of the memory, and they very greatly improve its performance in that information can be reliably read out in a considerably shorter access time.

What is claimed is:

1. In a memory construction for the storage of *m* words each having *n* bits, including

*n* magnetic cores each having a "0" aperture and a "1" aperture with a central magnetic leg therebetween,

*m* primary windings each extending through the "0" apertures of some cores to determine the storage of "0's" therein, and extending through the "1" apertures of other cores to determine the storage of "1's" therein, a secondary winding wound around the central leg of each of said magnetic cores, said memory construction having such a large number *m* of primary windings and having a pattern of stored information such that the undesired magnetic and capacitive coupling between said *m* primary windings causes imbalance in output signals induced in at least some of said secondary windings, the improvement comprising the addition of an endless compensating winding extending through the "0" apertures of magnetic cores needing reinforcement of the "1" sense signals therefrom, and extending through the "1" apertures of magnetic cores needing reinforcement of the "0" sense signals therefrom, whereby the selection and energization of any single one of said *m* primary windings causes a balancing voltage to be induced in said compensating winding so that readily distinguishable "0" and "1" signals are obtained from the secondary windings on the respective magnetic cores.

2. The combination as defined in claim 1 wherein said endless compensating winding includes series resistance to limit and shape the waveform of the current flow therein.

3. The combination as defined in claim 1 wherein said endless compensating winding courses through all of said *n* magnetic cores a plurality of times with the winding extending through "0" and "1" apertures numbers of times proportioned to provide respective needed amounts of compensation.

4. The combination as defined in claim 1, and in addition, a second compensating winding extending through "0" and "1" apertures of selected cores, and means to apply a pulse to said additional compensating winding whenever any one of said *m* primary windings is selected and energized.

5. In a memory construction for the storage of *m* words each having *n* bits, including

*n* magnetic cores each having a "0" aperture and a "1" aperture with a central magnetic leg therebetween,

*m* primary windings each extending through the "0" apertures of some cores to determine the storage of "0's" therein, and extending through the "1" apertures of other cores to determine the storage of "1's" therein, a secondary winding wound around the central leg of each of said magnetic cores, said memory construction having such a large number *m* of primary windings and having a pattern of stored information such that the undesired magnetic and capacitive coupling between said *m* primary windings causes imbalance in output signals induced in at least some of said secondary windings, the improvement comprising the addition of a compensating winding extending through "0" and" 1" apertures of selected cores, and means to apply a pulse to said compensating winding whenever any one of said *m* primary windings is selected and energized.

References Cited

UNITED STATES PATENTS 3,290,664 12/1966 Hsueh et al. ........ 340—174

BERNARD KONICK, Primary Examiner

S. B. POKOTILOW, Assistant Examiner

U.S. Cl. X.R.

307—88